Sept. 20, 1932.     E. P. MANTELL     1,878,955
AIR VEHICLE
Original Filed March 28, 1930    3 Sheets-Sheet 3
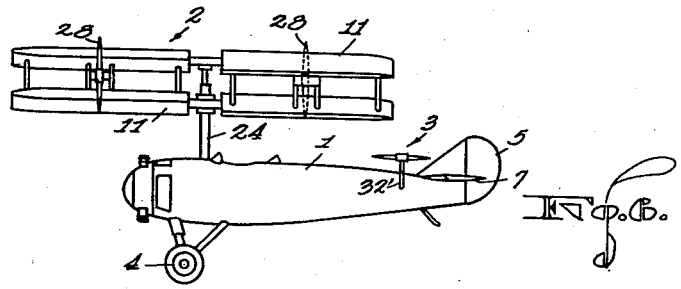
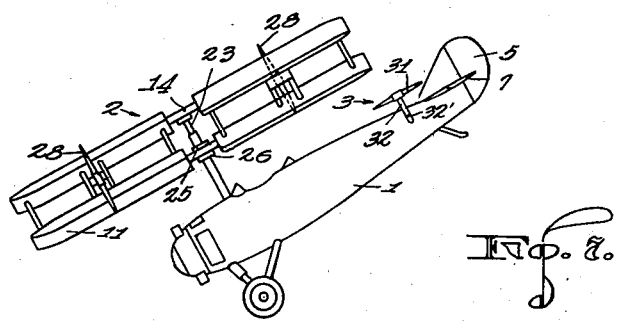
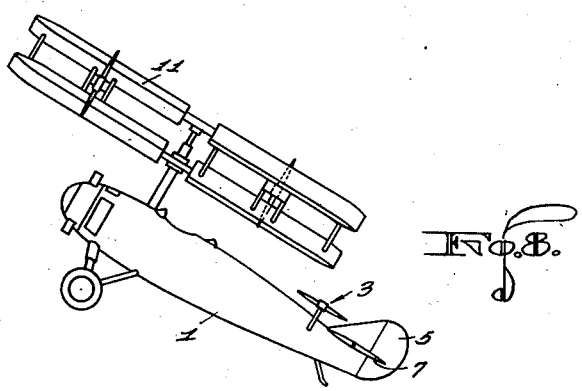
INVENTOR.
EDWARD P. MANTELL.
BY
ATTORNEYS.

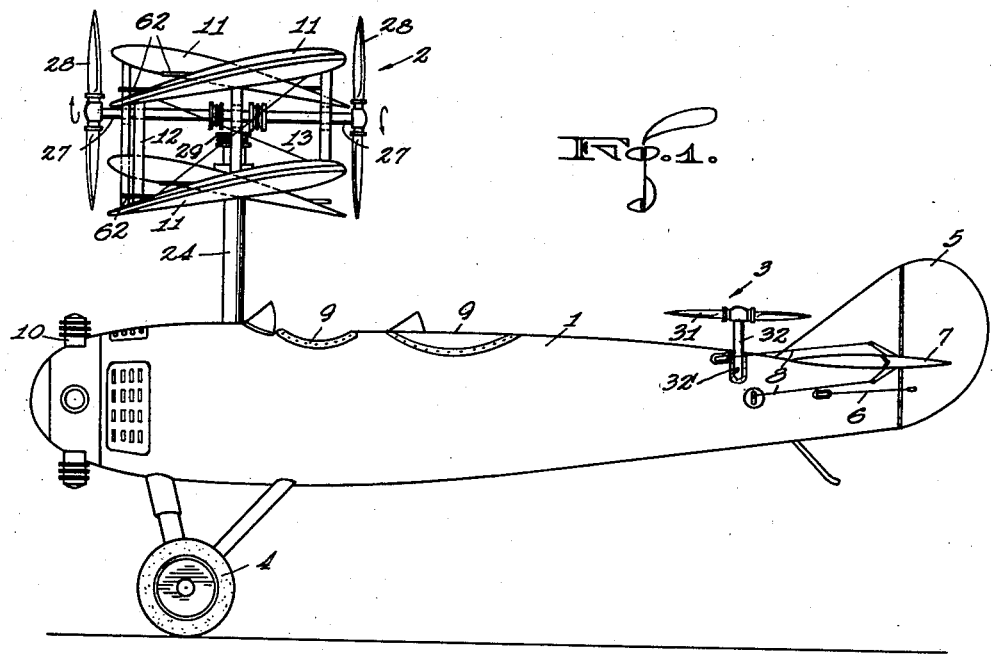
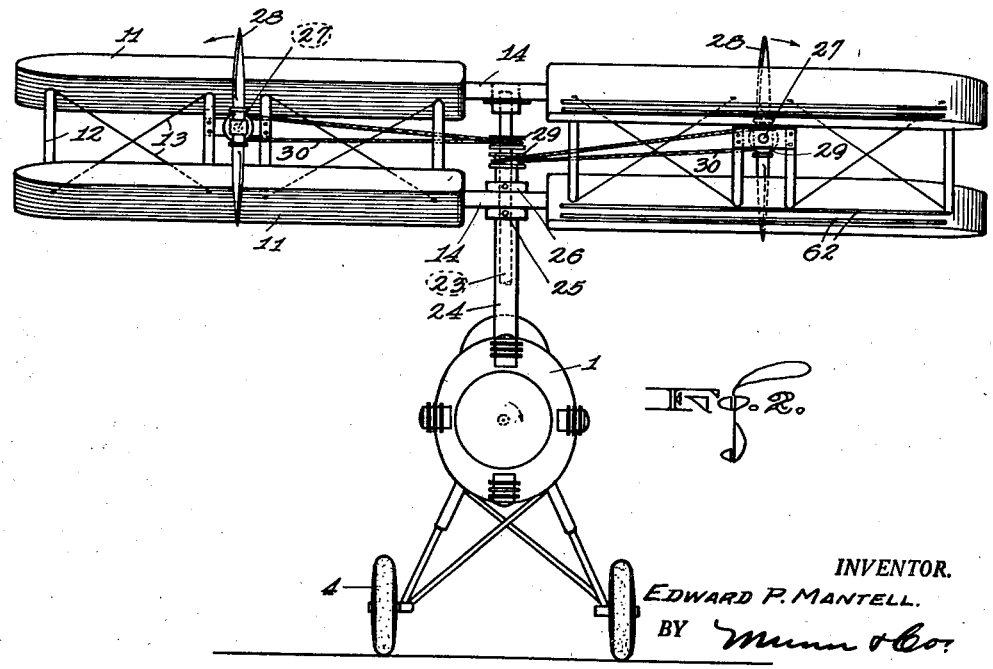

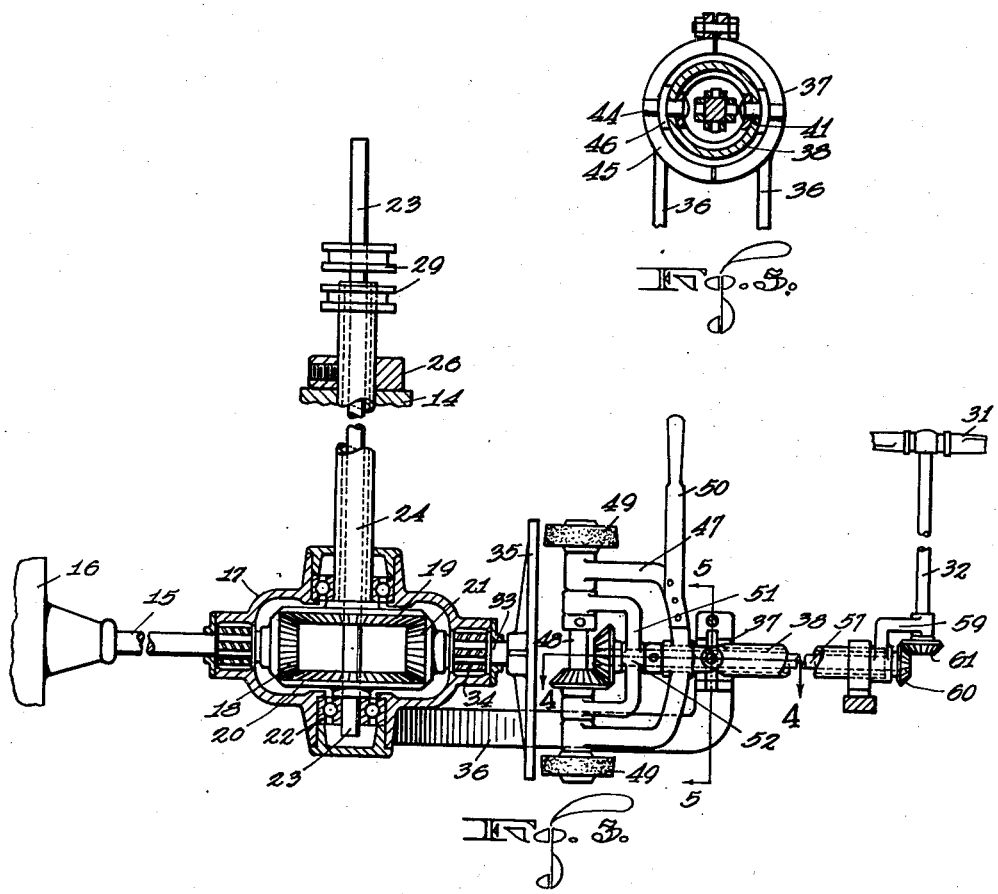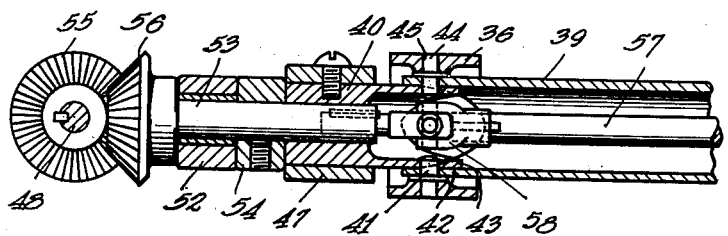

Patented Sept. 20, 1932

1,878,955

UNITED STATES PATENT OFFICE

EDWARD P. MANTELL, OF SAN FRANCISCO, CALIFORNIA

AIR VEHICLE

Application filed March 28, 1930, Serial No. 439,735. Renewed May 25, 1932.

The present invention relates to improvements in air vehicles, and its principal object is to combine in an air vehicle means for vertically raising the same and means for advancing the vehicle in a forward direction whenever a desired height has been obtained.

A further object of the invention is to provide a single means for carrying out both of the said objects. A further object of the invention is to utilize the lifting means of an air vehicle for raising and propelling the same and to eliminate the propellers used at the present time for pulling or pushing the vehicle body altogether.

I have made observation that forward flying may be obtained as a resultant of a force pulling upward on an air vehicle body in the fashion of a helicopter and a second force giving directional downward movement to the vehicle, the two combined effects producing straight-forward travel, or climbing or falling travel, according to the relative strength of the two forces.

On account of this observation I am enabled to utilize the means for vertically raising the vehicle in helicopter style for forward travel by means of a slight adjustment in the position of the lifting means which may be brought about by a movement of the vehicle body.

It is proposed in the present invention for the purpose of effecting such positional adjustment of the lifting means to provide means in connection with the body of an airplane whereby the latter may be tilted in a vertical plane, and also turned about an intermediate point regardless of any movement of the vehicle body. While in the conventional type of airplane, the latter may be tilted by means of various control elements, it is understood that these control elements such as ailerons, elevators, rudders, et cetera, depend for operativeness upon forward movement of the body of the air vehicle. In my invention the control means are made to act independently of any travel of the vehicle body since my tilting movements have to be initiated while the airplane is substantially standing still. In addition to my device for bringing about various tilting movements of the airplane, I preferably use the conventional means which serve the purpose of controlling airplane movements while the same is in flight.

Further objects and advantages of my invention will appear as the specification proceeds.

The preferred form of my invention is illustrated in the accompanying drawings, in which Figure 1 shows a side view of my air vehicle, Figure 2 a front view of the same, Figure 3 an enlarged detail view showing the transmission mechanism used in my invention, Figure 4 an enlarged horizontal section taken along line 4—4 of Figure 3, Figure 5 a similarly enlarged transverse section taken along line 5—5 of Figure 3, and Figures 6, 7 and 8, schematic views showing my airplane in different flying positions.

While I have shown only the preferred form of my invention, I wish to have it understood that various changes or modifications may be made within the scope of the claims hereto attached without departing from the spirit of the invention.

In its preferred form my air vehicle comprises a body 1, means for raising the same vertically indicated at 2, and means for tilting the body indicated at 3.

The body itself may be of conventional form and is preferably equipped with suitable landing gear indicated at 4, a rudder shown at 5, a control means 6 for the same, an elevator shown at 7, and a control means 8 for the same. Cockpits 9 may be provided in the usual manner and a power plant 10 is preferably mounted in the forward section of the body.

The means for vertically raising the body comprise one or more pairs of propeller wings 11. In the drawings 2 pairs of wings are shown but it should be understood that one pair, or more than two pairs would serve the same purpose. These elements are referred to as propeller wings because they correspond in size and position, and in effect substantially to the wings employed in the conventional type of airplanes, while on the other hand they are used as propellers and the two wings of each pair are inclined in opposite directions, in the position shown in Figure 1, one of the wings of each pair pointing forward and the other pointing rearward, and the two wings being mounted for rotation about a vertical axis in opposite directions so as to have a propeller-like action.

Revolving motion may be imparted to the propeller wings by any suitable means and only one of these means is shown and will be described in the present application, while it is understood that any other well known means for carrying out the purpose falls within the scope of the present invention.

As will be noted from the drawings, the corresponding wings of the two pairs are rigidly interconnected by means of struts 12 and ties 13, and the wings of each pair are interconnected by horizontal members 14 so that the entire wing assembly forms a rigid unit. The power transmitting mechanism is shown in detail in Figure 3 from which it appears that the power shaft 15 extending rearwardly from the power plant 16 projects into a housing 17, and terminates in a beveled pinion 18, meshing with two bevel gears 19 and 20 respectively, which latter mesh with a beveled pinion 21. The bevel gear 20 is suitably supported in a bearing 22 and is mounted on a shaft 23, which extends vertically through the center of the bevel gear 19, and through the body of the air vehicle, and also through the lower horizontal member 14 into the upper horizontal member 14, which latter rests on the shaft with freedom of rotary motion, relative thereto. The upper gear 19 has a sleeve 24 extending upward therefrom in concentric relation to the shaft 23, and this sleeve also extends through the body wall and through the lower horizontal member 14 but stops short of the upper member 14 as shown in Figure 2. The lower horizontal member 14 is revolvable on the sleeve 24 but is held against end-wise motion by means of two collars 25 and 26.

Each of the two sets of wings mounted on opposite sides of the vertical shaft 14 has a horizontal shaft 27 supported therein in any suitable manner and propellers 28 are mounted on these shafts, on opposite sides of the wings as shown in the drawings so that when the propellers 28 are rotated they actuate the wings into rotary motion. The two propellers 28 receive rotary motion in opposite directions from the shaft 23, and the sleeve 24 respectively through suitable pulleys shown at 29, and belts indicated at 30.

It will be understood from the arrangement thus far described that through the transmission mechanism shown in Figure 3 and the propellers 28, revolving motion is imparted to the propeller wings 11 for lifting the body of the plane in a straight upward direction.

It should be noted that the shaft 23 and the sleeve 24 connect the body and the propeller wings into a rigid unit, and that the shaft 23 and the sleeve 24 are mounted well toward the front of the body so that a considerable portion of the tail of the body extends beyond the reach of the wings sufficient to allow the tilting means indicated at 3 to work at a favorable leverage.

The tilting means comprise a propeller 31 mounted on a shaft 32 projecting radially from the tail end of the airplane body through a slot 32'. The transmission operating this propeller is shown in detail in Figure 3 and includes means for reversing the direction of the propeller as well as means for swinging the propeller shaft 32 in a transverse plane.

For a detailed description of the transmission reference is had to Figure 3 from which it appears that the pinion 21 previously mentioned is mounted on a rearward extending shaft 33 carried on a bearing 34, and terminating in a rearwardly facing disc 35. The housing 17 has a bracket 36 extending rearwardly therefrom which as shown at 37 forms a bearing for a tubular housing 38 consisting of two sections 39 and 40 jointed within the bearing by means of pins 41 extending through projecting tongues 42 and 43 of the two sections so that the two sections are pivoted together and are free to turn on the pins 41. The latter pins have extensions 44 projecting into transverse slots 45 formed in the bearing 37 which hold the two sections of the housing against end-wise movement but allow of rotary movement within the bearing, the pins having washers 46 interposed between the outer section 39 of the housing and the bearing 37 for facilitating rotary movement of the housing in the bearing. The section 40 of the tubular housing is comparatively short and supports a yoke 47, the two arms of which hold a shaft 48 in substantially parallel relation to the disc 35, the shaft being provided at its extreme ends with two friction wheels 49 adapted to bear against the face of the disc 35 as the yoke 47 is tilted one way or the other by means of the handle 50. A second smaller yoke 51 is supported on the shaft 48 and forms a bearing 52 for a shaft 53 which extends into the section 40 of the housing previously referred to, the bearing of the yoke 52 being separated from the section 40 by means of a collar 54. Two pinions 55 and 56 mounted on the shafts 48 and 53 respectively transmit motion from the former to the latter, and the shaft 53 is connected to a second shaft 57 by means of a universal joint 58, the center of which lies on the center of the turning movement of the two sections 39 and 40 of the housing. The rear end of the housing section 38 terminates in a bracket 59 which supports the propeller shaft 32 and the rear end of the shaft 57 terminates in a pinion 60 meshing with a pinion 61 provided at the lower end of the propeller shaft.

The operation of the propeller shaft transmission should be readily understood from the foregoing description. As long as the parts are in the position shown in Figure 3 the propeller 31 remains unaffected. For causing the propeller to rotate the operator manipulates the handle 50. If he tilts the handle forward the upper friction wheel 49 contacts with the disc 35 and transmits rotary motion through the pinions 55 and 56, the shafts 53 and 57 and the pinions 60 and 61 to the propeller shaft 32. This tilting motion may be carried out due to the fact that the joint between the shafts 53 and 57 is universal and the two sections 39 and 40 of the housing are pivoted together by the horizontal pins 41.

To reverse the direction of rotation of the propeller 31 the operator pulls the lever 50 backward which causes the lower friction wheel 49 to contact with the disc 35, motion being transferred to the propeller 31 in the manner previously described.

For swinging the propeller 31 in a transverse direction, that is, either to the right or to the left, the operator swings the handle 50 to the right or to the left as the case may be. This movement will leave the shafts 53 and 57 practically unaffected, but will turn the housing for the shaft, the turning movement being made possible by the fact that the extensions 44 of the pins 41 ride in slots 45 in the bearing for the housing.

The operation of my invention is best described by referring to the Figures 6, 7 and 8. For straight upward travel the propeller 31 remains disconnected in the manner shown in Figure 3, while the wings are revolved. The wings will raise the vehicle substantially in the manner shown in Figure 6 to any desired height and the vehicle may be brought to a stop at any desired height by regulation of the speed with which the wings revolve. To impart forward movement to the vehicle, the operator pushes forward on the handle 50, which causes the propeller 31 to revolve and to raise the rear end of the body. Since the body and the wings form a rigid unit this motion brings about a slanting position of the wings and at the same time a downward sliding effect which is opposed by the upward pull of the wings. The combined effect of these two forces is forward travel which may be in an inclined direction according to the relative strength of the two forces responsible for the movement.

If the pilot desires to come to a stop he operates the handle 50 for revolving the propeller 31 in a reverse direction, which tends to push the rear end of the body downward and to bring the entire device into the position shown in Figure 8 in which the wings exercise a retarding effect, although still lifting the vehicle. The latter may thus be made to come to a stand-still in the air, and to assume a normal position as in Figure 6, when the propeller 31 is made to stop rotating.

Normally the entire vehicle, while standing still, would assume a position so as to face the wind and if it is desired to bring the vehicle into any other position while the same is at rest in the air, the pilot may turn the handle 50 to the right or to the left which will cause the propeller 31 to swing about the body and to exert pull in the desired direction when one of the friction wheels 49 is brought into contact with the disc 35.

During normal flying the usual control elements such as the elevator 7 and the rudder 5 may be used to advantage.

In order to allow the pilot to retain a certain degree of control over the air vehicle, even when the motor fails to function, I provide a number of fins 62 on the top face of the propeller wings and near the rear edge thereof. When the motor ceases to function while the air vehicle is in the air, and the vehicle descends as a consequence these fins will be struck by air currents which tend to revolve the wings so that the latter will have a retarding effect and cause the vehicle to descend slowly and to remain partly under control.

I claim:

1. An airplane comprising a pair of revolvably mounted propeller wings, means for revolving the wings, an elongated body suspended from the wings, a propeller active on the tail end of the body for tilting the wings and means for operating the propeller, comprising means for rendering the same active and inactive, and means for shifting the propeller in a transverse plane.

2. An airplane comprising an airplane body, means for raising the same vertically forming a rigid unit therewith, a propeller active on the tail end of the body in a transverse direction and means for revolving the propeller including means for reversing the direction of rotation and means for adjusting the propeller in a transverse plane.

3. An airplane comprising an airplane body having a shaft rising vertically therefrom, a pair of propeller wings on the shaft, means for revolving the wings, a propeller active on the tail end of the body in a transverse plane, and means for revolving the latter propeller, including means for reversing the direction of rotation of the propeller, in combination with means for tilting the propeller in a transverse plane.

4. An airplane comprising an airplane body, a propeller active on the tail end thereof, a power shaft having a transverse disc, a drive shaft, connecting means between the disc and the drive shaft for transmitting motion to the latter in either direction and an operative connection between the drive shaft and the propeller, the transmitting means having means associated therewith for turning the propeller about the body in a transverse plane.

EDWARD P. MANTELL.